UNITED STATES PATENT OFFICE.

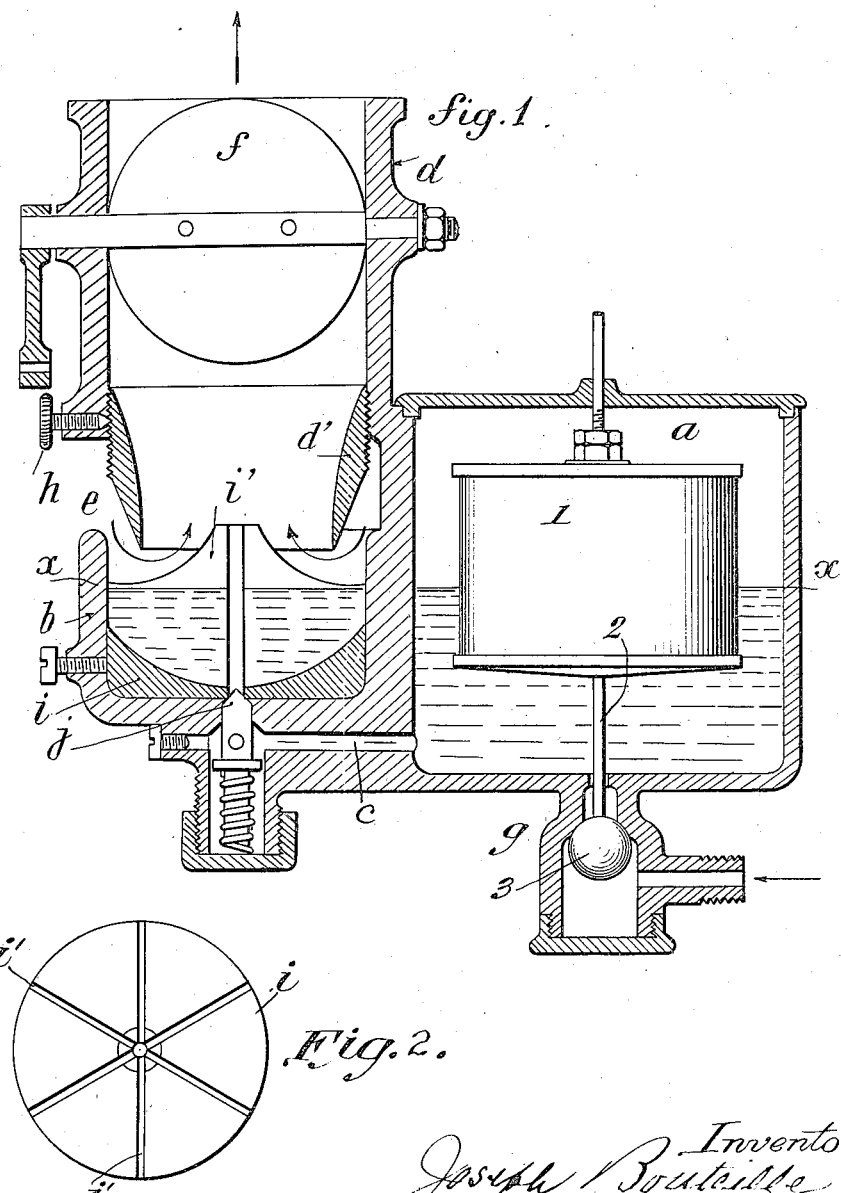

JOSEPH BOUTEILLE, OF NEUILLY-SUR-SEINE, FRANCE.

CARBURETER FOR INTERNAL-COMBUSTION ENGINES.

1,303,761.          Specification of Letters Patent.     Patented May 13, 1919.

Application filed December 21, 1914. Serial No. 878,433.

*To all whom it may concern:*

Be it known that I, JOSEPH BOUTEILLE, of 6 Rue de l'Ouest, Neuilly-sur-Seine, France, engineer, have invented new and useful Improvements in Carbureters for Internal-Combustion Engines, which improvement is fully set forth in the following specification.

This invention relates to carbureters and it has for its object to provide a carbureter in which the quantity of liquid fuel used is proportionate to the suction of an internal combustion engine, so that a more homogeneous mixture is obtained in spite of the variations, which are frequently great, in the suction of the air to be carbureted.

According to this invention the liquid fuel is contained in a relatively deep open vessel which is kept supplied with liquid fuel at a constant level in any suitable manner, said vessel being of such depth as not to be emptied at once by the suction of the engine, and the induction pipe from the engine projects nearly to the surface of the liquid fuel and has preferably an end adjustable with respect to the surface of said fuel. The fuel is drawn more or less quickly into this vessel in accordance with the varying speed of the air which is drawn over the surface of the fuel, which surface may be reduced by a suitable device positioned in said vessel.

The invention is capable of receiving a variety of mechanical expressions, one of which is shown on the accompanying drawings, but it is to be expressly understood that the drawings are for purposes of illustration only and are not to be construed as a definition of the limits of the invention, reference being had to the appended claims for that purpose.

In said drawings—

Figure 1 is a vertical sectional view of a construction embodying the present invention;

Fig. 2 is a detail plan view of the space-filling block shown in Fig. 1.

Referring to the drawings—

*a* is a chamber having the ordinary float or other mechanism for normally maintaining the liquid fuel at a constant or nearly constant level *x—x* in a vessel *b* communicating therewith through the passageway *c*. As shown in the drawings, the float mechanism comprises a float 1 positioned in the chamber *a* and carried by a guide rod 2. At the bottom of the rod 2 is a ball valve closure 3 which coöperates with a suitable seat in the fuel inlet *g* to close the fuel inlet when the float rises and to open the fuel inlet when the float falls. The induction pipe *d* of the engine comes nearly to the surface of the fuel in the vessel *b*, an annular space being formed between its walls and those of the vessel *b*, which space is made to suit the engine to which the carbureter is fitted. This space forms the inlet for the air and creates a certain resistance to the air which causes it to pass through at a greater speed thereby helping to draw up the fuel.

The apparatus may be provided if desired with a throttle valve *f* or other suitable means for controlling the outlet.

The operation is as follows:—

The liquid fuel entering through the fuel inlet *g* is maintained at a practically constant level *x—x* in the chamber *a*; it passes through the passageway *c* to the orifice *j* through which the vessel *b* is filled as it is emptied by the varying suction of the engine. The air passing at a high speed through the space *e* draws fuel from the vessel *b* into the induction pipe *d*.

The greater the suction of the engine the greater is the quantity of fuel drawn up, whereby the carburation is substantially perfect. There is also the advantage that all the fuel which remains liquid in the pipe *d* is recovered since it falls back into the vessel *b*; economy is thus obtained and all danger of catching fire is removed.

In order that the end of the induction pipe *d* may be adjusted with respect to the surface of the fuel in the vessel *b*, the end of the induction pipe *d* may be provided with an adjustable cone *d'* which can be fixed by the screw *h* at any height in the vessel *b*.

The surface of the fuel in the vessel *b* may be reduced by a block *i* having in it a number of saw cuts *i'*, as shown in Fig. 2. This prevents too large a quantity of fuel from being drawn up, without changing in any way the operation of the carbureter. Any device for enabling the engine to run very slowly may be added, for example, a pipe dipping into the vessel *b* and delivering the necessary fuel above the throttle valve *f*.

While the embodiment shown on the drawings has been described with considerable particularity, it is to be expressly understood that the invention is not to be restricted thereto, as the same is capable of receiving a variety of mechanical expressions, some of which will readily suggest themselves to those skilled in the art, while certain features thereof are capable of use without other features thereof. Reference is therefore to be had to the appended claims for a definition of the limits of the invention.

Claims:

1. In a carbureter for internal combustion engines, a relatively deep vessel open to the atmosphere, means supplying said vessel with liquid fuel and tending to maintain a substantially constant level therein, said vessel being of such depth as not to be emptied by the suction of the engine, and a duct leading to the intake of the engine and terminating at its inlet end within the vessel and closely adjacent the level which said first-named means tends to maintain, said duct at its inlet end having a longitudinally adjustable section to vary the distance between the same and said level, the surface of the fuel in said vessel coacting with the inlet end of said duct to control the admission of air to said duct.

2. In a carbureter for internal combustion engines, a relatively deep vessel open to the atmosphere, means supplying said vessel with liquid fuel and tending to maintain a substantially constant level therein, said vessel being of such depth as not to be emptied by the suction of the engine, a duct leading to the intake of the engine and terminating at its inlet end within the vessel and closely adjacent the level which said first-named means tends to maintain, and means in said vessel to provide a reduction of the surface area of the fuel, the surface of the fuel in said vessel coacting with the inlet end of said duct to control the admission of air to said duct.

3. In a carbureter for internal combustion engines, a relatively deep vessel open to the atmosphere, means supplying said vessel with liquid fuel and tending to maintain a substantially constant level therein, a block in said vessel to provide a reduction of the surface area of the fuel and having a plurality of vertical slots constituting fuel passages, and a duct leading to the intake of the engine and terminating at its inlet end within the vessel and closely adjacent the level which said first-named means tends to maintain.

In testimony whereof I have signed this specification in the presence of two subscribing witnesses.

JOSEPH BOUTEILLE.

Witnesses:
DE WITT C. POOLE, Jr.,
GEORGES DELOES.